Patented Oct. 2, 1945

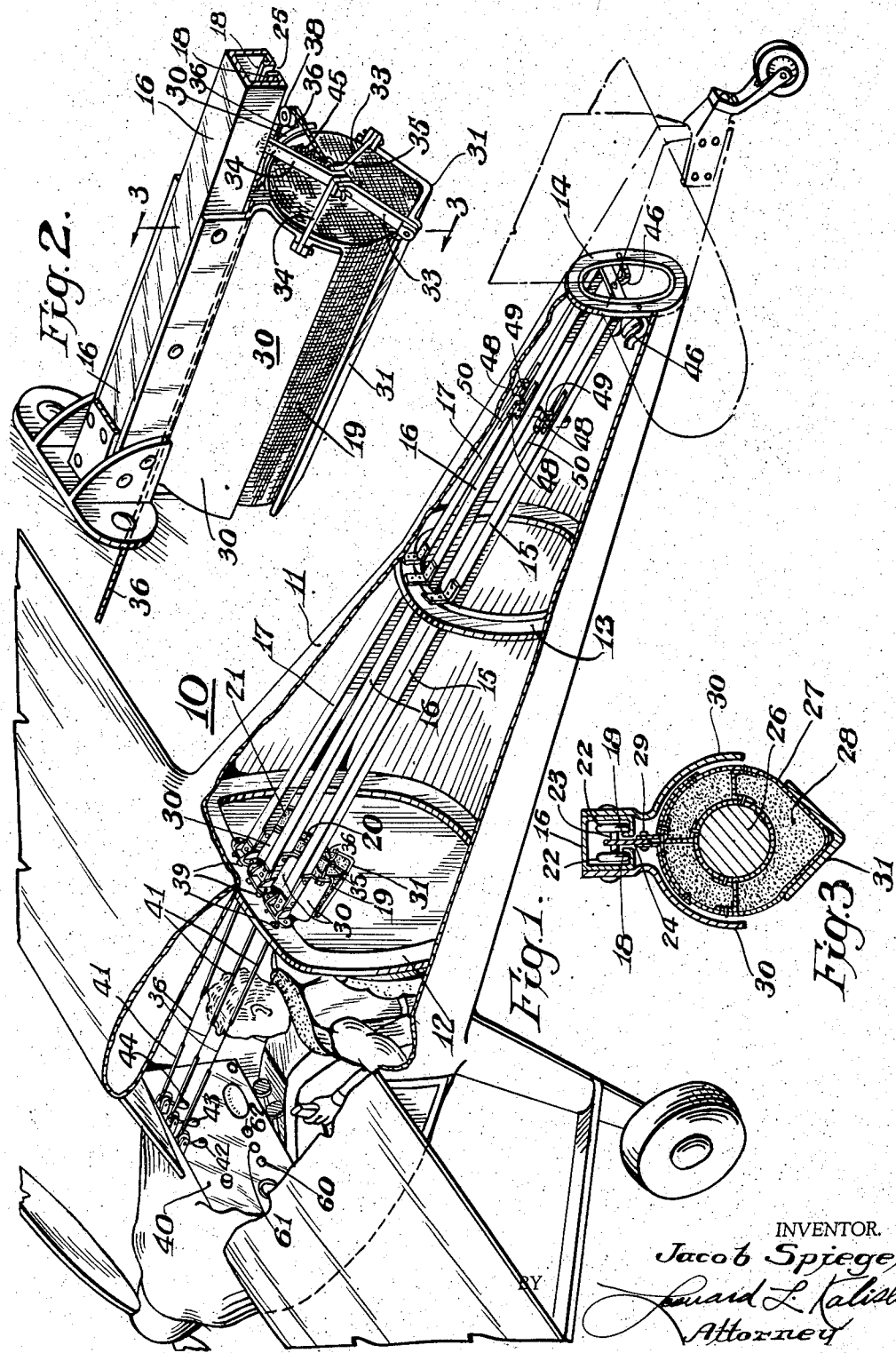

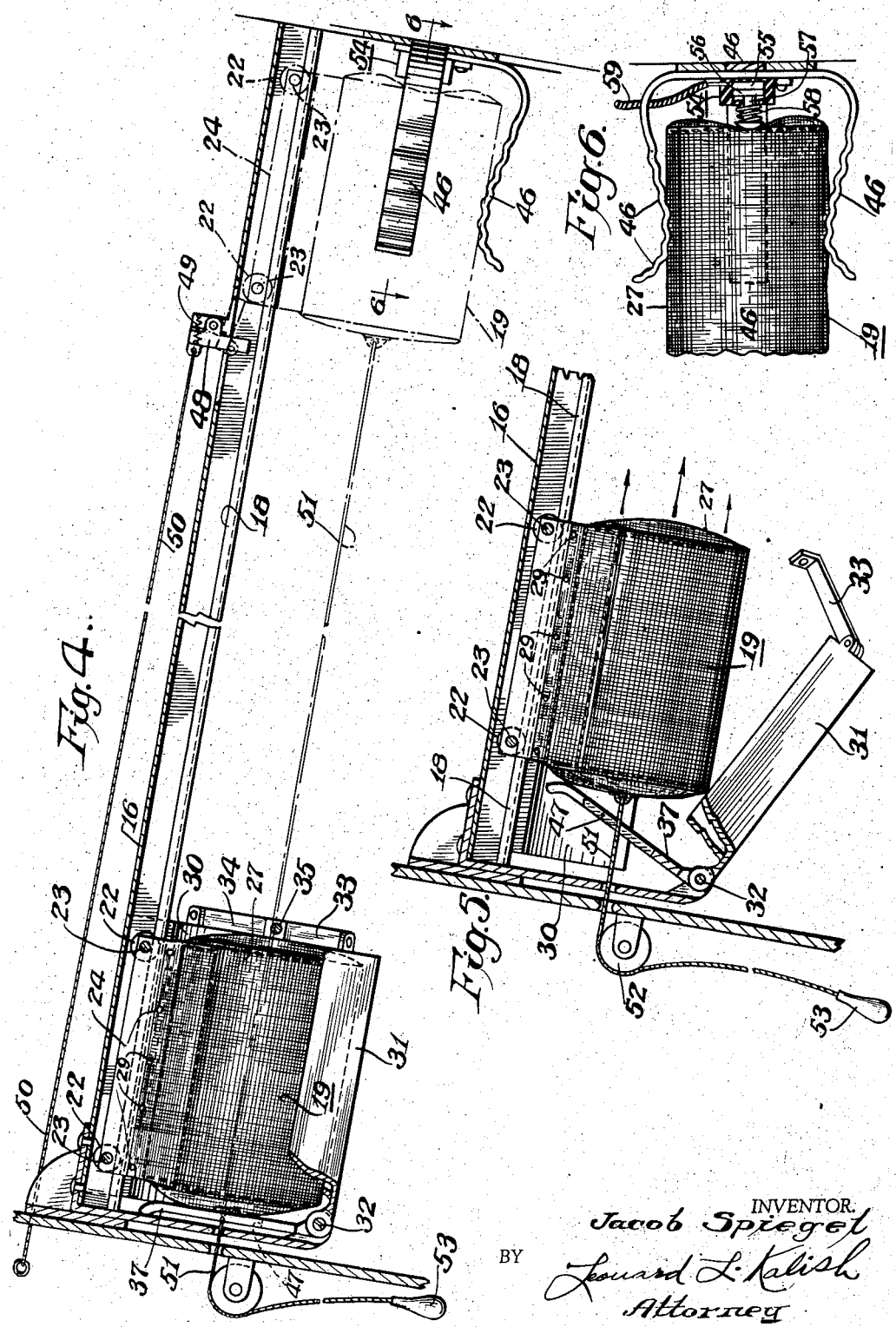

2,385,850

UNITED STATES PATENT OFFICE 2,385,850

LANDING STABILIZER FOR AIRCRAFT

Jacob Spiegel, Philadelphia, Pa.

Application April 10, 1942, Serial No. 438,375

7 Claims. (Cl. 244—93)

The present invention relates to certain new and useful improvements in aircraft and it relates more particularly to novel stabilizing means for use during landing of fixed-wing heavier-than-air craft.

The operation of fixed-wing heavier-than-air craft presents certain difficulties which tend to limit the usefulness thereof. Fixed-wing heavier-than-air craft, as is well known, are sustained in flight by the differential pressure above and below the wings thereof—such pressure, in turn, being created by the forward movement of the aircraft. Thus, the aircraft must, at all times, maintain a minimum forward speed in order to keep it responsive to the controls and to sustain it in flight. This minimum forward speed varies, of course, with the size and type of the aircraft but, in all cases, is appreciable—even the lightest and smallest of aircraft having a minimum operating speed of approximately 60 miles per hour.

It is apparent, therefore, that a fixed-wing heavier-than-air craft must land at a considerable speed ranging from 40 miles per hour upward, even where wing flaps are used. Present-type fixed-wing aircraft, when landing at this speed, necessarily require a run of at least several hundred feet before they can be halted safely. In present-type fixed-wing aircraft it is impractical to attempt to reduce this run by braking the wheels since the forward momentum of the craft would cause it to nose over or to "ground-loop" with the resulting danger to the aircraft and to the pilot and other occupants thereof.

An object of the present invention is to provide stabilizing means for more safely landing a fixed-wing aircraft within a shorter distance.

Another object of the present invention is to provide means whereby the center of gravity of the fixed-wing aircraft can be shifted during the landing operation in order to permit braking of the wheels and, at the same time, to prevent nosing over.

Still another object of the present invention is to provide means for changing the center of gravity of a fixed-wing aircraft rearwardly during a landing operation—the amount of shifting or "trimming" being controlled by, and varied at the will of, the operator.

With the above and other objects and advantages in view as will be apparent in the following specification, appended claims and accompanying drawings, the present invention comprises certain novel features and details of construction as will be fully brought out hereinbelow.

For the purpose of illustrating the invention, there is shown in the accompanying drawings one form thereof which is at present preferred, since the same has been found in practice to give satisfactory and reliable results, although it is to be understood that the various instrumentalities of which the invention consists can be variously arranged and organized and that the invention is not limited to the precise arrangements and organizations of the instrumentalities as herein shown and described.

Referring to the accompanying drawings in which like reference characters indicate like parts throughout:

Figure 1 represents a fragmentary perspective view of an aircraft embodying the present invention—parts being broken away better to reveal the construction thereof.

Figure 2 represents a perspective view on a somewhat enlarged scale of one of the shiftable weights shown in Figure 1.

Figure 3 represents a cross-sectional view generally along the line 3—3 of Figure 2.

Figure 4 represents a fragmentary side elevational view of the shiftable weight and the track shown in Figure 1—the weight being shown in solid lines as it appears during operation of the aircraft, and being shown in dotted lines as it appears during landing of the aircraft.

Figure 5 represents a fragmentary elevational view showing the shiftable weight and the release mechanism as it appears at the moment the weight is released.

Figure 6 represents a cross-sectional view generally along the line 6—6 of Figure 4 showing the means for retaining the weight in its rearmost position and showing the indicating electric switch.

In one embodiment of the present invention, I may provide a fixed-wing aircraft indicated generally by the numeral 10. The aircraft 10, as shown in Figure 1, is a traction-type high-wing monoplane of generally conventional construction having a fuselage 11 in which are disposed a forward bulkhead 12, a central bulkhead 13 and a rearmost bulkhead 14—the bulkheads conforming to the rearwardly-tapered fuselage section.

The traction propeller of the aircraft 10 is of conventional construction and is driven by a conventional power plant (not shown) installed preferably in the nose of the plane, in front of the cockpit.

The aircraft 10 is provided with a braking system of conventional construction (not shown) whereby the wheels may be braked upon landing to give a short run and a rapid stop.

I may provide a plurality (preferably 3 of tracks 15, 16 and 17 which are affixed to the bulkheads 12, 13 and 14 in any conventional manner as for example by brackets suspended from the upper sides of the bulkheads. The tracks 15, 16 and 17 extend generally longitudinally within the fuselage 11 preferably the entire distance from the forward cockpit to the tail.

Each of the tracks 15, 16 and 17 is of generally enclosed rectangular cross-section slotted at the bottom as at 25 and with inturned flanges 18. The tracks may be of light weight metal alloy or any other suitable material.

The tracks are preferably inclined so that when the aircraft 10 is on the ground the forward end of the tracks will be appreciably higher than the rearmost end thereof.

Weights indicated generally by the reference characters 19, 20 and 21 are slidably suspended from the tracks 15, 16 and 17 respectively.

Each of the weights 19, 20 and 21 includes spaced pairs of rollers 22 mounted within the tracks 15, 16 and 17 and capable of rolling freely therealong. The rollers 22 are connected by axles 23 from which a generally flat panel 24 extends downwardly through the slot 25. The weight is of generally cylindrical form having a central core 26 which may be of lead or other heavy weight-giving material. The core 26 is enclosed by a jacket 27 which may be of canvas or other durable flexible material filled with sand 28 to give a yielding and shock-absorbing outer surface.

The jacket 27 is fastened to the lower protruding edge of the panel 24 by any conventional means as for example by rivets 29.

It is apparent that when the aircraft is resting upon the ground, as shown in Figure 1, the tracks 15, 16 and 17 will be inclined so that the weights 19, 20 and 21 would normally run down to the rear end of the tracks upon their rollers 22 unless retained at the forward end of the tracks by a locking device.

In the drawings, I have shown one form of locking device for retaining the weights at the forward end of the tracks and for releasing said weights when desired.

Each of the retaining means includes a pair of curved panels 30 which may be riveted or otherwise fastened to the opposite vertical sides of the tracks adjacent the front bulkhead 12, and which conform generally to the upper half of the outer surface of the canvas jacket 27.

A lower trough-like member 31 which has a generally V-shaped cross-section is hingedly mounted as at 32 adjacent said forward bulkhead 12. The member 31 is adapted to deformingly support the lower surface of the canvas jacket 27 as shown particularly in Figure 3.

A pair of arms 33 are hingedly diagonally mounted at the rear end of the member 31 and are adapted to cooperate with a pair of arms 34 similarly hingedly diagonally mounted upon the curved panels 30—the arms 33 and 34 having registering openings therein whereby they can be held in closed position by a cotter pin 35. When the arms 33 and 34 are in their closed position, they operate to retain the slidable weight in its forward position. When, however, the cotter pin is pulled free of the arms 33 and 34 by a light cable 36 attached thereto, the arms 33 and 34 are free to swing open and thereby to permit the hinged lower trough-like member 31 to drop and thereby to permit the slidable weight to run downward and rearward along the track.

The member 31 may be provided with an upwardly extending lever 37 disposed in front of the slidable weight so that the dropping of the member 31 will cause the lever 37 thereof to push said weight rearwardly as shown in Figure 5. This positive pressure augments the normal tendency of the weight to slide rearwardly and is sufficient to overcome any possible tendency of the weight to remain in its forward position due to sticking or "freezing" of the rollers 22.

The cable 22 attached to the cotter pin 35 may be passed over a pulley 38 and may extend through a suitable opening 39 in the forward bulkhead 12 to the instrument board 40 in the cockpit.

A length of rigid tubing 41 may enclose that portion of the cable 36 which is in the cockpit in order to prevent accidental displacement of said cable. The cable 36 terminates in a suitable handle adjacent the instrument board 40 whereby said cable can be pulled by the pilot to release the cotter pin 35 and thus to release the slidable weight—handles 42, 43 and 44 being provided to release weights 19, 20 and 21 respectively.

A small spring 45 may be provided so as normally to retain the cotter pin 35 within the aligned openings in the arms 33 and 34 and to prevent accidental slipping out of said cotter pin 35. When, however, the cable 36 is pulled by the pilot, the cotter pin 35 is withdrawn against the action of the spring 45 to release the arms 33 and 34 and the member 31 and thereby to move the slidable weights rearwardly.

Means are also provided to retain the slidable weights at the rear ends of the tracks. The retaining means may include a plurality, as for example 3, of spaced spring clips or jaws or fingers 46 mounted upon the rearmost bulkhead 14. The clips 46 are disposed below each of the tracks 15, 16 and 17 in position to receive the slidable weights when said weights reach the rearmost ends of their respective tracks. The clips 46 are preferably transversely corrugated whereby they deform the canvas jacket 27 and more firmly retain the weight in its rearmost position.

A safety catch 48 is pivotally mounted upon the upper side of the track in such a way as to permit the rollers 22 of the weight to slide rearwardly past the catch 48 but to prevent said rollers and said weight from accidentally sliding forwardly, as might otherwise be the case should the aircraft nose downward. A small spring 49 holds the catch 48 in its obstructing position. A release cord 50 may be attached to the catch 48 whereby said catch may be opened to the position shown in dotted lines in Figure 4 when it is desired to move the weight to the forward end of the track.

A rope 51 is attached to the forward end of the canvas jacket 27 and passes through a slot 47 in the lever 37 and through an opening in the forward bulkhead 12. The rope 51 passes over a reel or pulley 52 and terminates in a handle 53 whereby the shiftable weight can be pulled to its forward position after the landing has been completed.

A switch indicated generally by the reference character 54 is disposed at the rear end of each of the tracks 15, 16 and 17 respectively. The switch 54 includes a fixed contact 55 and a moveable contact 56—the moveable contact 56 being carried by a plunger 57 which is normally held in its extended position by a coil spring 58. When the plunger 57 is in its extended position, the switch is open. When, however, the moveable weight slides to the rear end of the track, it forces the plunger 57 inward until the moveable contact 56 abuts the fixed contact 55 so that the switch is closed. Suitable wiring 59 leads from the switch 54 to a source of electricity, as for example a battery or a generator, and an indicating electric light bulb upon the instrument board 40—indicating bulbs 60, 61 and 62 corresponding to weights 19, 20 and 21 respectively. When each of the slidable weights is in its rearmost position, its switch will be closed, its circuit will be completed and its corresponding indicating bulb will be lit. In this way, the pilot will be enabled to tell at a glance whether or not the several weights are in their rearmost position.

The operation of my novel stabilizing device will now be described.

The three weights 19, 20 and 21 are normally in their forward position as shown in Figures 1 and 2, in which they are held firmly by the arms 33 and 34 of the member 31 and the panel 30 respectively. The weights 19, 20 and 21 are kept in their forward position during take-off and during normal flying.

During a landing operation, however, the weights are intended to be shifted to their rearmost position in order that the center of gravity of the plane is shifted appreciably rearwardly and so that the tail of the plane becomes substantially heavier whereby nosing over is prevented. When the center of gravity is thus shifted rearwardly and when the tail of the plane is made substantially heavier, it is possible to brake the wheels of the aircraft without the danger (which would otherwise be imminent) of having the plane nose over. In this way, the plane can be brought to a halt in a fraction of the space which otherwise is required to land a plane which cannot be so braked.

When the pilot brings his plane in to land, he proceeds in the usual way except that, as soon as his wheels touch the ground, he pulls the handles 42, 43 and 44 operating the cables 36 and releasing the cotter pins 35 whereby the weights 19, 20 and 21 are moved to the rear end of the tracks 15, 16 and 17 and are retained there by the spring clips 46. The spring clips 46 serve the additional function of cushioning the shock and preventing the sliding weights from damaging the frame of the plane. Rollers 22 pass the safety catch 48 which is immediately forced back by its spring 49 to the locked position thus preventing accidental return of the weights. As soon as the weights 19, 20 and 21 are seated within the spring clips 46 the switches 45 are closed and the indicating bulbs 60, 61 and 62 light up as an indication to the pilot that the transfer of weight has been effected. In this way, the pilot knows that it is safe to apply the brakes to the wheels of the aircraft and to bring the plane to an abrupt halt.

It is, of course, possible for the pilot to release one or two of the shiftable weights instead of all where this is desired. In such case, of course, only the corresponding indicating bulbs would light up upon completion of the transfer of the weights.

After landing has been completed, the safety catch 48 is opened by pulling on the cord 50 and the weights are brought back to their forward position by means of the rope 51, the pulley 52 and the handle 53. When the weights are pulled back to their forward position the trough-like member 31 is locked in the position shown in Figures 1 and 2 by closing the arms 33 and 34 and inserting the cotter pin 35.

The plane is then ready to take off and to perform a similar landing operation.

The weights 19, 30 and 21, in their forward position, are held generally at the center of gravity of the plane so that they do not affect the operating trim of the plane.

As mentioned hereinabove, the cables 36 are protected by the rigid lengths of tubing 41 to prevent accidental release of the weights during flight and prior to landing.

The sand-filled canvas jacket 27 serves as a padding to prevent undue stresses upon the frame of the plane and also, by reason of its flexibility, serves better to retain the shiftable weights in their desired positions.

The embodiment in the drawings is but one example of the novel stabilizing means of my present invention. Thus, my stabilizing means could be incorporated into other types of fixed-wing aircraft of any suitable construction including low-wing planes, multi-wing planes, pusher-type planes, multi-engine planes, etc. The tracks could be otherwise installed within the fuselage of the plane and other types of supporting tracks could be used without departing from the spirit of the present invention. The number of shiftable weights could, of course, be varied with the requirements of the particular aircraft.

By use of my present invention, it is possible to land a plane in a much smaller landing area and, indeed, in the case of light planes, it is possible to land upon an extremely small area. In fact, by use of my novel stabilizing device, it is possible to land a light aircraft upon the roof of a building or within a small yard or field. It is thus apparent that the range of usefulness of light aircraft is considerably broadened since they can be used for family use or for errands and deliveries within a city without the need for impractical and costly regulation landing fields.

The novel stabilizing means of my present invention is also adapted for use with military aircraft. Thus, by use of my stabilizing means, military aircraft which normally operate at extremely high speeds and which, therefore, normally require unusually large landing areas can be landed safely in considerably smaller areas.

My present invention is also adapted for use with sea-based aircraft such as carrier-based aircraft and sea-planes. Thus, a sea-plane equipped with the novel stabilizing means of my present invention has considerably less tendency to nose over upon landing than is ordinarily the case. Similarly, a carrier-based aircraft equipped with the novel stabilizing means of my present invention is capable of landing upon a relatively small flight deck without the need for complicated landing devices such as are otherwise required.

The present invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention.

The invention having thus been described, what is hereby claimed to be new and desired to be secured by Letters Patent is:

1. In an aircraft having a fixed wing, a fuselage, a power-plant, a propeller and landing gear, a plurality of rearwardly-sloping tracks mounted longitudinally within said fuselage, a truck mounted upon each of said tracks and freely movable therealong, a counterweight carried by each of the trucks, independent releasable means for retaining each of the counterweights at the upper forward end of its track during normal flying in which position the counterweights are generally adjacent the center of gravity of said aircraft, independent pilot operated means for releasing each of said retaining means to permit each of said counterweights to move rapidly to the rear of the aircraft during a landing operation whereby said aircraft is made adjustably tail-heavy to prevent nosing-over, independent means for immovably engaging each of said counterweights at the lower rearward end of its track, and independent auxiliary locking means disposed adjacent the lower rearward end of each of said tracks for preventing forward movement of each of said counterweights.

2. In an aircraft having a fixed wing, a fuselage, a power plant, a propeller and landing gear, a plurality of rearwardly-sloping tracks mounted longitudinally within said fuselage, a truck mounted upon each of said tracks and freely movable therealong, a counterweight carried by each of the trucks, independent releasable means for retaining each of the counterweights at the upper forward end of its track during normal flying in which position the counterweights are generally adjacent the center of gravity of said aircraft, independent pilot operated means for releasing each of said retaining means to permit each of said counterweights to move rapidly to the rear of the aircraft during a landing operation whereby said aircraft is made adjustably tail-heavy to prevent nosing-over, independent means for immovably engaging each of said counterweights at the lower rearward end of its track, independent electrically-operated indicating signals for each of said counterweights, and an electric switch adapted to be operated by movement of each of said counterweights to actuate the corresponding signal and thereby to indicate the position of said counterweight.

3. In an aircraft having a fixed wing, a fuselage, a power-plant, a propeller and landing wheels, a rearwardly-sloping track mounted longitudinally within said fuselage, a truck mounted upon said track and freely movable therealong, a counterweight carried by said truck, said counterweight including a relatively dense weight-giving core and a padded jacket surrounding said core, releasable means for retaining said counterweight at the upper forward end of said track during normal flying of said aircraft, in which position said counterweight is generally adjacent the center of gravity of said aircraft, said retaining means including a fixed plate conforming generally to the contour of said counterweight and generally adjacent the upper portion thereof, a pivoted angle holder generally adjacent the lower portion of said counterweight and hinged arms connecting the rear edges of said plate and said angle holder and enclosing said counterweight, means for releasing said retaining means to permit said counterweight to move rapidly to the rear of said aircraft during a landing operation whereby said aircraft is made appreciably tail-heavy to prevent nosing-over, said releasing means including means operable from the cockpit of the aircraft for unconnecting said hinged arms to permit said pivoted angle holder to fall open and to move said counterweight rearwardly, means for immovably engaging said counterweight at the lower rearward end of said track, and means for braking said landing wheels whereby said aircraft can be halted within a short distance after said counterweight has been shifted rearwardly.

4. In an aircraft having a fixed wing, a fuselage, a power-plant, a propeller and landing wheels, a rearwardly-sloping track mounted longitudinally within said fuselage, a truck mounted upon said track and freely movable therealong, a counterweight carried by said truck, releasable means for retaining said counterweight at the upper forward end of said track during normal flying of said aircraft, in which position said counterweight is generally adjacent the center of gravity of said aircraft, pilot operated means for releasing said retaining means to permit said counterweight to move rapidly to the rear of said aircraft during a landing operation whereby said aircraft is made appreciably tail-heavy to prevent nosing-over, means for immovably engaging said counterweight at the lower rearward end of said track, said engaging means comprising a plurality of spring-jaws adapted to be spread apart by and to grip said counterweight, and means for braking said landing wheels whereby said aircraft can be halted within a short distance after said counterweight has been shifted rearwardly.

5. In an aircraft having a fixed wing, a fuselage, a power-plant, a propeller and landing wheels, a rearwardly-sloping track mounted longitudinally within said fuselage, a truck mounted upon said track and freely movable therealong, a counterweight carried by said truck, releasable means for retaining said counterweight at the upper forward end of said track during normal flying of said aircraft, in which position said counterweight is generally adjacent the center of gravity of said aircraft, said retaining means including a pin-retained pivoted angle holder partially enveloping said counterweight, pilot operated means for releasing said retaining means to permit said counterweight to move rapidly to the rear of said aircraft during a landing operation whereby said aircraft is made appreciably tail-heavy to prevent nosing-over, said releasing means including a cable attached to the pin holding said angle holder whereby said pin may be pulled out to permit said angle holder to drop, means for immovably engaging said counterweight at the lower rearward end of said track, and means for braking said landing wheels whereby said aircraft can be halted within a short distance after said counterweight has been shifted rearwardly.

6. In an aircraft having a fixed wing, a fuselage, a power-plant, a propeller and landing wheels, a rearwardly-sloping track mounted longitudinally within said fuselage, a truck mounted upon said track and freely movable therealong, a counterweight carried by said truck, releasable means for retaining said counterweight at the upper forward end of said track during normal flying of said aircraft, in which position said counterweight is generally adjacent the center of gravity of said aircraft, pilot-operated means for releasing said retaining means to permit said counterweight to move rapidly to the rear of said aircraft during a landing operation whereby said aircraft is made appreciably tail-heavy to prevent nosing-over, means for immovably engaging said counterweight at the lower rearward end of said track, an electrically-operated indicating signal, an electric switch adapted to be closed by said weight in its rearmost position thereby to actuate said signal, and means for braking said landing wheels whereby said aircraft can be halted within a short distance after said counterweight has been shifted rearwardly.

7. In an aircraft, a weight adapted for free movement generally longitudinally of said aircraft, said weight being normally urged toward the rear of said aircraft, releasable means for retaining said weight at a forward position substantially at the normal center of gravity of said aircraft, pilot-operated means for releasing said weight thereby to permit said weight to move rapidly rearwardly of the normal center of gravity of said aircraft, means for immovably engaging said weight in its rearmost position, independent auxiliary locking means for preventing forward movement of said weight from its rearmost position, means operable from the cockpit of said aircraft for releasing said auxiliary locking means, and means operable from the cockpit of said aircraft for returning said weight to its forward position.

JACOB SPIEGEL.